Oct. 24, 1944. L. R. SIMMONS 2,360,901
HITCH
Filed Dec. 4, 1941
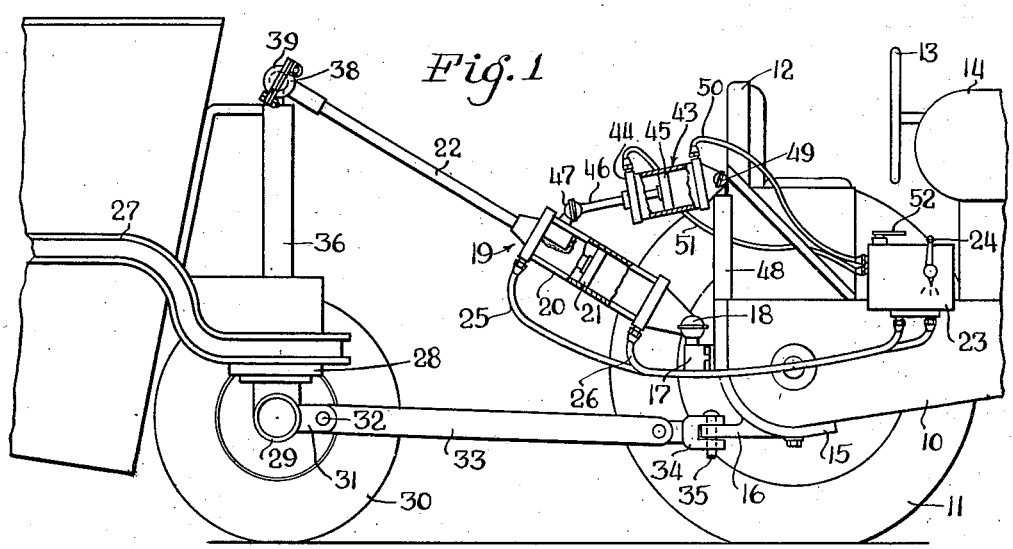
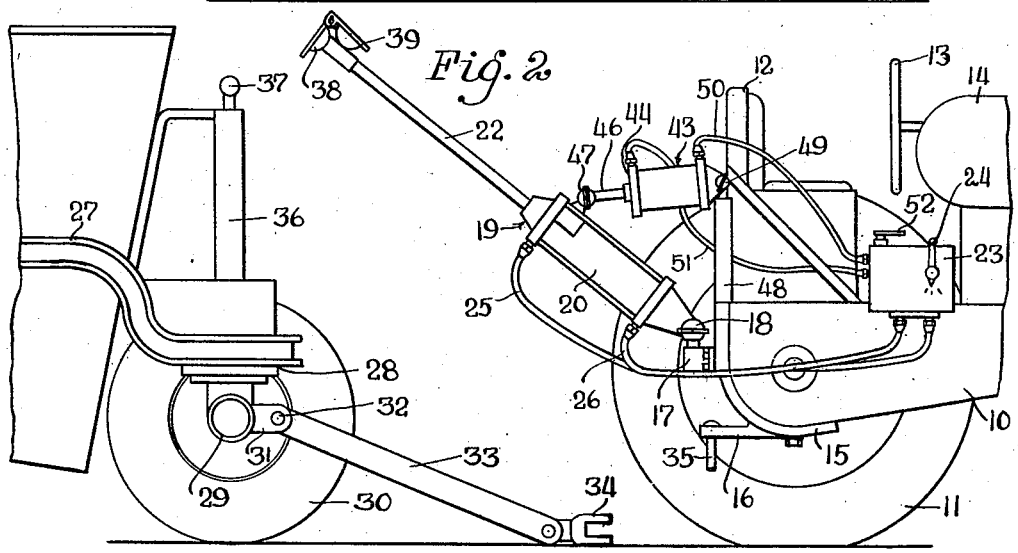
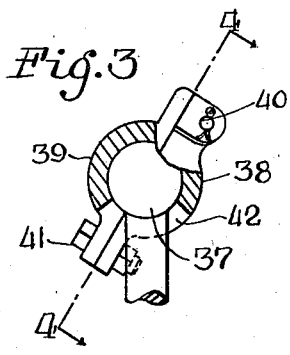
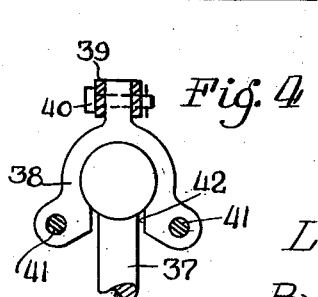
Inventor
Lovel R. Simmons
By Harold W. Knoth
Atty.

Patented Oct. 24, 1944

2,360,901

UNITED STATES PATENT OFFICE 2,360,901

HITCH

Lovel R. Simmons, Jackson, Miss.

Application December 4, 1941, Serial No. 421,610

17 Claims. (Cl. 280—33.2)

General statement of invention

This invention relates to hitch means for an articulated vehicle unit. In other aspects, the invention pertains to power-operated means adapted as an attachment for a tractor or similar vehicle and usable in conjunction with a trailer or similar vehicle connected to the tractor, or capable of use independently of such trailer as a power device for lifting, hoisting, and similar tasks.

As representative of a preferred use of the present invention, reference is had to a vehicle unit in which a tractor and trailer are interconnected by draft means. The trailer is of the full or four-wheel type and, for the purpose of temporarily transferring part of the weight of the trailer to the tractor, means are employed between the tractor and trailer for raising the front of the trailer with respect to the tractor, thus relieving the front wheels of the trailer of at least part of the weight of the trailer, this weight, or a portion thereof, being transferred through the raising means to the tractor. In this manner, the tractor carries part of the weight of the trailer and, as a result of this weight or pressure, has increased tractionability without the use of wheel weights or the like.

One form of means of the type referred to is shown in my copending application, Serial No. 413,550, filed October 3, 1941. This means is there shown as including a pressure device in the form of a two-way fluid pressure cylinder and piston connected to the rear of a tractor and the front of a trailer and expansible for the purpose of raising the trailer with respect to the tractor. The device is also contractible for raising the rear of the tractor with respect to the trailer.

In a structure of the type just discussed, the pressure device is quite heavy and is, therefore, difficult to handle manually in the connecting of the tractor and trailer. Further, since it is often desired to use the tractor independently of a single trailer, it becomes important to have means by which the tractor and trailer or other trailers may be quickly and easily connected and disconnected. At the same time, it is desirable to have the pressure device available as a power unit capable of use with the tractor in conjunction with other vehicles or objects requiring the application of power thereto.

Statement of the objects of the invention

With the foregoing in mind, the following objects of the invention will become readily apparent.

It is the principal object of the invention to provide a device, for use in a tractor-trailer or similar vehicular unit, that will be readily adjustable and connectible and disconnectible between the vehicles.

An important object is to utilize the relative movement between the piston and cylinder, or equivalent members of a similar device, for the alining of attaching parts in the connection of vehicles.

Another important object is to provide means for adjusting the pressure device bodily with respect to the vehicles for alinement of attaching connections.

A further object is to provide control means for the combining of the aforesaid adjustment.

The invention seeks as another object the operation of the adjusting means by the vehicle power source.

A still further object is to provide a quickly attachable and releasable connection for the draft means between the vehicles.

And still another object is to utilize the adjustable pressure device as a force-exerting means for the application of force or power to other vehicles and objects to be moved.

Description of the figures in the drawing

Figure 1 is an elevational view of a representative vehicle unit in which the invention may be suitably employed, portions of each vehicle being omitted;

Figure 2 is a view similar to that in Figure 1, showing the parts in disconnected positions or as ready for connection;

Figure 3 is an enlarged fragmentary view showing in detail the releasable attachment means for the connection of the pressure device to one vehicle; and Figure 4 is a transverse sectional view taken on the line 4—4 of Figure 3.

Description

For the purposes of illustration and disclosure, a tractor-trailer unit has been shown, but it is to be understood that the invention is similarly applicable to other types of vehicles or vehicle units. Accordingly, reference to "tractor" and "trailer" is to be taken as including reference to such other vehicles.

In Figure 1, the rear portion of a tractor is illustrated, the reference character 10 designating a longitudinal body or frame. Rear drive wheels, only one of which is shown at 11, support the rear end of the tractor and are driven from the usual engine or power plant, not shown. The tractor structure includes an operator's seat 12, steering wheel 13, and fuel tank 14.

The rear end of the tractor body has rigidly secured thereto a supporting bracket 15, which serves as a draft means and has a rearwardly extending draft member 16. An upper portion of this bracket carries a connecting member 17 that provides a ball and socket joint 18 for the support of a force-exerting means preferably in the form of a fluid pressure device 19. This device preferably includes a two-way hydraulic cylinder 20 and piston 21, the latter having a rod 22 connected thereto and extending rearwardly and upwardly from the tractor body. A suitable fluid pump is indicated at 23, this pump being driven in any suitable manner from the tractor engine and serving as a power source for the device 19. A control handle 24 controls, through suitable valve mechanism, not shown, the supply of fluid through conduits 25 and 26 connected at opposite ends of the cylinder 20. Control of the pump 23 permits reciprocation of the piston with respect to the cylinder 20, the piston and cylinder thus providing a pair of relatively movable or extendible members, the functioning of which will appear hereinafter in greater detail.

The trailer front end shown is illustrated as having a main frame 27 supported on a steerable front truck structure that includes a turntable 28, transverse axle 29, and front wheels 30 (only one of which is shown). The axle 29 has a forwardly extending bracket structure 31 providing a pivotal connection 32 for a forwardly extending draft member or draw tongue 33. The forward end of the tongue has a clevis 34 adapted for quick connection to the draft member 16 of the tractor, preferably by means of a pin 35 dropped through the clevis and draft member 16. A forward and upper portion of the trailer includes a rigid supporting structure 36 having a connecting member in the form of a ball joint 37. The ball 37 and draft tongue 33 provide connecting members for the attachment of the trailer to the tractor.

The rear or free end of the piston rod 22 includes means by which the pressure device may be quickly attached to or detached from the trailer. This means preferably takes the form of a two-part socket element having complementary halves 38 and 39 hinged together on a transverse pin 40 and rigidly but removably securable together by suitable locking means, which may be, and is illustrated as, a pair of bolts 41. As best shown in Figures 3 and 4, the socket half 38 is forked, as at 42, and is thus adapted to engage the lower portion of the ball or connecting member 37.

In the operation of the tractor-trailer unit as described above, the trailer is normally supported on its front and rear wheels and is thus drawn by the tractor. When a particularly difficult stretch of road is encountered, it may occur that the tractor drive wheels are unable to secure sufficient traction. Under these circumstances, fluid is supplied to the device 19 to extend the piston 21, thus exerting a raising force on the front end of the trailer sufficient to relieve the front wheels of the trailer of part of the trailer weight and to transfer this weight to the tractor rear end, after which the increased weight or pressure enables the tractor drive wheels to obtain the necessary traction.

As shown in Figure 2, the device 19 and tractor draft member 16 are disconnected from the trailer connecting members 33 and 37. Assuming that connection of the necessary element is to be made, it will be seen that the socket members 38 and 39 must first be alined with the ball member 37 on the trailer. For this purpose, the present invention provides the adjusting means, which will now be described.

As previously stated, the pressure device 19 is mounted on the tractor through the medium of the ball and socket joint 19, and hence may be swung bodily through a longitudinal vertical plane. At the same time, the piston, when disconnected from the trailer, may be adjusted relative to the cylinder and moves in the same plane. An adjusting means, preferably in the form of a pressure device 43, is provided for adjusting the device 19. This second pressure device may be, and is shown as, a two-way cylinder 44 and piston 45, the latter including a piston rod 46 connected to the cylinder 20 preferably by a ball and socket joint 47. The tractor carries supporting structure 48, to which the cylinder 44 is connected, also by pivot means, such as a ball and socket joint 49. The pump 23 provides a power source for operation of the device 43, fluid being supplied at opposite ends of the cylinder 44 through conduits 50 and 51, control being effected through suitable valve means, not shown, and a control lever 52. Either or both of the connections 47 or 49 may be quickly detachable, after the fashion of the joint shown at 38—39.

*Operation*

When the trailer is disconnected from the tractor, as shown in Figure 2, and it is desired that a connection be made of the component elements, the tractor is backed toward the standing trailer. The pressure device or adjusting means 43 is operated by the operator on the tractor by means of the control lever 52 on the pump 23, and the device 43 is adjusted bodily about a transverse axis through the ball and socket joint 19 until the quickly attachable means 38, 39 on the piston rod 22 is alined with the ball member 37 on the trailer. In the event further adjustment is required, the control lever 24 on the pump 23 may be operated to raise or lower the piston relative to the cylinder 20. With the necessary parts alined, the forked member 38 at the end of the piston rod 22 will engage the ball 37, after which the complementary member 39 may be locked in place. In this respect, it will be understood that any suitable automatic connecting means may be substituted for the connection made at 37, 38, 39. The draft tongue 33 may then be connected to the tractor by means of the pin 35 and draft member 16, and the unit is ready for operation. In disconnecting the device 19 from the trailer, the procedure just set forth is reversed.

When the tractor is to be utilized apart from the trailer, the power devices 19 and 43 provide suitable means for attachment to other vehicles or objects to be moved by the tractor. For example, the devices may be employed as means for hoisting and loading logs and similar articles. Or the device 19 may be connected to a stationary object and contracted as means for raising the tractor rear end for any of a number of different purposes, much as the tractor is raised when the device is connected in place between the tractor and trailer. In addition to the many and varied uses to which the invention in any of its forms may be put, there exist several advantages in the use of one tractor, equipped according to the invention, with several trailers, graders, scrapers, or other vehicles, inasmuch as the devices 19 and 43 remain on the tractor when disconnected from the trailer. Another advantage of such an arrangement is that, when fluid pressure devices are employed instead of other equivalent devices, the connections between such devices and the trailer are mechanical and do not entail the separation of fluid conduits. As an additional advantage, the devices 19 and 43, when remaining connected to the tractor, contribute their weight to the tractor, and this increases the ability of the tractor to obtain traction, eliminating to a large extent, and in some cases entirely, the use of wheel weights and the like.

Various other advantages and features will appear to those skilled in the art, as will other adaptations of the invention, such as the substitution for either or both of the devices 19 and 43 other means capable of performing the aforesaid and other functions, and such as the use of the devices 19 and 43 or their equivalents in situations involving other structures and problems. With the foregoing in mind, it is to be understood that such changes, modifications, and alterations may be made without departing from the spirit and scope of the invention as defined in the appended claims.

What is claimed is:

1. In combination with a vehicle having a longitudinal body and a power source, a pressure device, including a two-way cylinder and a piston disposed at the rear of the vehicle with the piston extending generally rearwardly and upwardly from the vehicle; means connecting the cylinder to the vehicle body for adjustment of the cylinder and piston as a unit through a longitudinal vertical plane; means for operating the pressure device; means associated with the vehicle power source for adjusting the cylinder and piston as aforesaid, including a second pressure device connected between the cylinder and vehicle body, said second pressure device including a two-way cylinder and piston; and means associated with the vehicle power source for operating the second device.

2. For use with a tractor-trailer unit wherein the trailer includes a first connecting member and a second connecting member and the tractor includes a draft means adapted for connection to the first connecting member of the trailer: pressure means adapted to be connected between the tractor and the second connecting member of the trailer comprising a cylinder and a piston extending rearwardly from the tractor toward the second connecting member of the trailer; means mounting the pressure means at one end on the tractor for adjustment of said pressure means bodily with respect to the second connecting member on the trailer for alinement of the other end of said pressure means with said connecting member; and means on the tractor for adjusting said pressure means.

3. For use with a tractor-trailer unit wherein the trailer includes an upper connecting member and a lower connecting member and the tractor includes a draft means adapted for connection to one connecting member of the trailer: means adapted for connection between the tractor and the other connecting member of the trailer comprising a pair of elements relatively extendible between the tractor and trailer; means mounting one of said elements on the tractor for vertical adjustment of said elements as a unit for alinement of the other of said elements with said other connecting member of the trailer; means for adjusting said elements vertically as a unit; means for extending said elements relatively for further alinement of said one element with said other connecting member of the trailer; and means adapted to connect said one element to said other connecting member of the trailer.

4. In combination with a power vehicle having a body and a power plant, a pressure cylinder; means connecting the cylinder to the vehicle body for pivotal adjustment of the cylinder with respect to the body; a piston carried by the cylinder for movement therein and adapted to be connected to an object to be moved by the vehicle; means associated with the power vehicle power plant for operating the piston in the cylinder; and means connected between the cylinder and vehicle body for adjustment of the cylinder to a selected pivotal position for occupation thereby during movement of the piston in said cylinder.

5. In combination with a power vehicle having a body and a power plant, a pressure cylinder; means connecting the cylinder to the vehicle body for pivotal movement of the cylinder about a transverse axis; a piston carried by the cylinder for axial movement therein and adapted to be connected to an object to be moved by the vehicle; means associated with the power vehicle power plant for operating the piston in the cylinder; power-operated means connected between the cylinder and vehicle body for pivoting the cylinder about the aforesaid pivot axis to a selected position of pivotal adjustment and for maintaining such adjustment while the cylinder is moved within the cylinder, and means associated with the vehicle power plant for supplying operating power to said power-operated means.

6. In combination with a vehicle having a body, a force-exerting device, said device including a pair of members relatively movable rectilinearly, one of which is adapted to be connected to an object to be moved by the vehicle; means connecting the other member to the vehicle body for accommodating adjustment of the force-exerting means with respect to the body transversely of the line of rectilinear movement for said member; means for forcibly so relatively moving said members; and means for so transversely adjusting the force-exerting means and maintaining such adjustment during the relative movement of said members.

7. For use with an articulated vehicle train including first and second vehicles wherein the first vehicle has first and second connecting members and the second vehicle has a draft means adapted for connection to the first connecting member of the first vehicle: force exerting means adapted to be connected between the second vehicle and the second connecting member of the first vehicle comprising a pair of relatively movable members between the vehicles; means mounting the force exerting means at one end on the second vehicle for adjustment of said force exerting means bodily with respect to the second connecting member on the first vehicle for alinement of the other end of said force exerting means with said connecting member; and means on the second vehicle for adjusting said force exerting means.

8. For use with a tractor-trailer unit wherein the trailer includes an upper connecting member and a lower connecting member and the tractor includes a draft means adapted for connection to the lower connecting member of the trailer: a pressure cylinder; means connecting the cylinder to the tractor for vertical adjustment of the cylinder about a pivot axis transversely of the tractor; a piston carried by the cylinder and adapted to be connected to the upper connecting member of the trailer; means for operating the piston; and means for adjusting the cylinder about the aforesaid pivot axis for alinement of the piston with the upper connecting member of the trailer.

9. In a tractor-trailer unit including a tractor having a power plant and a trailer to be connected at the rear of the tractor, said trailer including first and second connecting members and the tractor including a first member adapted for connection to the trailer first connecting member: the combination with the tractor of means carried thereby for adjustment with respect to the tractor and adapted to be connected to the trailer second connecting member; and means for adjusting said means for alinement with and connection to said second connecting member on the trailer.

10. For use with a tractor-trailer unit including a tractor, a trailer to be connected behind the tractor, wherein the trailer includes a draft member and a connecting member disposed above the draft member: a pressure device; means connecting said device to the tractor for vertical adjustment with respect to the tractor and trailer, said device including a pair of members relatively movable generally longitudinally between the rear of the tractor and the front of the trailer; releasable attachment means on one of said members for the attaching of said member to the connecting member of the trailer; means for adjusting the pressure device vertically as aforesaid for alinement of the attachment means and the connecting member; and releasable means for connecting the draft member to the tractor.

11. In a tractor-trailer unit including a tractor having a power plant and a trailer to be connected at the rear of the tractor, said trailer including first and second connecting members and the tractor including a first member adapted for connection to the trailer first connecting member: the combination with the tractor of means carried thereby for adjustment with respect to the tractor and adapted to be connected to the trailer second connecting member; and means removably connected between said first means and the tractor for adjusting said first means for alinement with and connection to said second connecting member on the trailer.

12. For use with a tractor-trailer unit wherein the trailer includes an upper connecting member and a lower connecting member and the tractor includes a draft means adapted for connection to the lower connecting member of the trailer: a pressure cylinder; means connecting the cylinder to the tractor for vertical adjustment of the cylinder about a pivot axis transversely of the tractor; a piston carried by the cylinder and adapted to be connected to the upper connecting member of the trailer; means for operating the piston; and means removably connected between the cylinder and tractor for adjusting the cylinder about the aforesaid pivot axis for alinement of the piston with the upper connecting member of the trailer.

13. In a tractor-trailer hitch, the combination of: a drawbar; means for attaching the drawbar directly to a trailer; universally articulate means for attaching the drawbar to a tractor; a cylinder-piston assembly, capable of being forcibly expanded; means for attaching this assembly to the trailer a substantial distance above the point of attachment of the drawbar; universally articulate means for attaching the assembly directly to the tractor adjacent the point of attachment of the drawbar; and means for forcibly expanding the cylinder-piston assembly.

14. A tractor-trailer hitch according to claim 13, further characterized by the disposition of said assembly and said drawbar relatively to the tractor and trailer and to one another that the line of action of said assembly and the line of action of said drawbar intersect approximately under the rear axle of the tractor.

15. The combination of: a draft vehicle; a drawn vehicle, having a main body and front and rear ground supports, the front support being swingable with respect to the main body for steering; a drawbar pivotally so universally articulately attached to the front of the drawn vehicle as to steeringly swing the front support thereof whenever the drawbar is swung laterally with respect to the drawn vehicle; universally articulate means for attaching the drawbar directly to the draft vehicles; a hydraulically energized compression element, capable of being forcibly expanded; means for universally pivotally attaching this compression element to the drawn vehicle a substantial distance above the point of attachment of the drawbar; universally articulate means for attaching the compression element directly to the draft vehicle adjacent the means of attachment of the drawbar; and means for forcibly expanding the compression element.

16. A tractor-trailer hitch according to claim 15, further characterized by the disposition of said assembly and said drawbar relatively to the tractor and trailer and to one another that the line of action of said assembly and the line of action of said drawbar intersect approximately under the rear axle of the tractor.

17. In a tractor-trailer hitch, the combination of: a drawbar; means for attaching the drawbar directly to a trailer; universally articulate means for attaching the drawbar to a tractor; a cylinder-piston compression element; capable of being forcibly expanded; means for attaching this compression element to the trailer a substatnial distance above the point of attachment of the drawbar; universally articulate means for attaching the compression element directly to the tractor adjacent the point of attachment of the drawbar; and means for forcibly expanding the cylinder-piston compression element.

18. The combination of: a draught vehicle; a drawn vehicle, having a main body and front and rear ground supports, the front support being pivoted about a vertical axis on the main body for steering; a drawbar, pivotally attached to the front support of the drawn vehicle by a horizontal pivot, but constrained against sidewise swinging with respect to said front support; universal means for attaching the drawbar directly to the draught vehicle; a compression element, capable of being forcibly expanded; means for pivotally attaching this compression element to the drawn vehicle by a horizontal pivot, located a substantial distance above the point of attachment of the drawbar, and so that the compression element is capable of swinging about substantially the same vertical axis on the main body as the drawbar; universal means for attaching the compression element directly to the draught vehicle adjacent the means of attachment of the drawbar; and means for forcibly expanding the compression element.

19. A combination according to claim 18, further characterized by the fact that the four points of attachment are so relatively located that the line of action of the compression member and the line of action of the drawbar will intersect approximately under the rear axle of the tractor.

LOVEL R. SIMMONS.